(12) United States Patent
Öztireli et al.

(10) Patent No.: US 11,074,743 B2
(45) Date of Patent: Jul. 27, 2021

(54) TECHNIQUES FOR PERFORMING POINT-BASED INVERSE RENDERING

(71) Applicants: DISNEY ENTERPRISES, INC., Burbank, CA (US); ETH Zürich, Zurich (CH)

(72) Inventors: Ahmet Cengiz Öztireli, Zurich (CH); Olga Sorkine-Hornung, Zurich (CH); Shihao Wu, Zurich (CH); Yifan Wang, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/586,746

(22) Filed: Sep. 27, 2019

(65) Prior Publication Data

US 2021/0065434 A1    Mar. 4, 2021

Related U.S. Application Data (60) Provisional application No. 62/894,947, filed on Sep. 2, 2019.

(51) Int. Cl.
*G06T 15/20* (2011.01)
*G06T 7/90* (2017.01)
*G06T 11/40* (2006.01)

(52) U.S. Cl.
CPC .............. *G06T 15/205* (2013.01); *G06T 7/90* (2017.01); *G06T 11/40* (2013.01); *G06T 2207/10028* (2013.01)

(58) Field of Classification Search
CPC .................................................... G06T 15/205
USPC ......................................................... 345/419
See application file for complete search history.

(56) References Cited

U.S. PATENT DOCUMENTS

| | | | |
|---|---|---|---|
| 2019/0228567 A1* | 7/2019 | Park .................... | G06T 15/50 |
| 2019/0279383 A1* | 9/2019 | Angelova ............ | G06N 3/0445 |

OTHER PUBLICATIONS

Achanta et al., "SLIC Superpixels Compared to State-of-the-Art Superpixel Methods", DOI: 10.1109/ TPAMI.2012.120., IEEE Transactions on Pattern Analysis and Machine Intelligence, vol. 34, No. 11, Nov. 2012, pp. 2274-2282.

Alexa et al.,"Computing and Rendering Point Set Surfaces", IEEE Transactions on Visualization and Computer Graphics, vol. 9, No. 1, Jan.-Mar. 2003, pp. 3-15.

(Continued)

*Primary Examiner* — Shivang I Patel
(74) *Attorney, Agent, or Firm* — Artegis Law Group, LLP (57) ABSTRACT

In various embodiments, a differentiable rendering application enables an inverse rendering application to infer attributes associated with a 3D scene. In operation, the differentiable rendering application renders an image based on a first set of points associated with the 3D scene. The differentiable rendering application then generates an artificial gradient that approximates a change in a value of a first pixel included in the image with respect to a change in an attribute of a first point included in the first set of points. Subsequently, the inverse rendering application performs optimization operation(s) on the first point based on the artificial gradient to generate a second set of points. Notably, an error associated with the second set of points is less than an error associated with the first set of points.

20 Claims, 5 Drawing Sheets

(56) References Cited

OTHER PUBLICATIONS

Azinovic et al., "Inverse Path Tracing for Joint Material and Lighting Estimation", arXiv preprint arXiv: 1903.07145, 2019, pp. 1-14.
Berger et aL, "A Survey of Surface Reconstruction from Point Clouds", DOI: 10.1111/cgf.12802, in Computer Forum, vol. 36, 2016, pp. 301-329.
Cignoni et al., "MeshLab: an Open-Source Mesh Processing Tool", In Eurographics Italian Chapter Conference, 2008, 8 pages.
Corsini et al., "Efficient and Flexible Sampling with Blue Noise Properties of Triangular Meshes", DOI: 10.1109/ TVCG.2012.34., IEEE Transactions on Visualization and Computer Graphics, vol. 18, No. 6, Jun. 2012, pp. 914-924.
Fan et al., "A Point Set Generation Network for 3D Object Reconstruction from a Single Image", DOI 10.1109/ CVPR.2017.264, IEEE Conference on Computer Vision and Pattern Recognition, vol. 2, No. 4, 2017, pp. 2463-2471.
Glorot et al., "Understanding the difficulty of training deep feedforward neural networks", In Proceedings of the 13th International Conference on Artificial Intelligence and Statistics, vol. 9, 2010, pp. 249-256.
Goodfellow et al., "Generative Adversarial Nets", In Advances in Neural Information Processing Systems (NIPS), arxiv:14062661v1, 2014, pp. 1-9.
Guerrero et al., "PCPNet Learning Local Shape Properties from Raw Point Clouds", arxiv:1710.04954v4, In Computer Graphics Forum (Proceedings of Eurographics), vol. 37, 2018, pp. 75-85.
He et aL, "Deep Residual Learning for Image Recognition", DOI 10.1109/CVPR.2016.90, IEEE Conference on Computer Vision and Pattern Recognition, 2016, pp. 770-778.
Heckbert, Paul S. "Fundamentals of Texture Mapping and Image Warping", Jun. 17, 1989, pp. 1-86.
Hermosilla et al., "Total Denoising: Unsupervised Learning of 3D Point Cloud Cleaning", arXiv preprint arXiv: 1904.07615, 2019, pp. 52-60.
Hermosilla et al., "Monte Carlo Convolution for Learning on Non-Uniformly Sampled Point Clouds", https://doi. org/10.1145/3272127.3275110, ACM, Transactions on Graphics, vol. 37, No. 6, Article 235, Nov. 2018, pp. 235:1-235:12.
Hoppe et al., "Surface Reconstruction from Unorganized Points", Proc. Of SIGGRAPH, vol. 26, No. 2, Jul. 26-31, 1992, pp. 71-78.
Hu et al., "Render4Completion: Synthesizing Multi-view Depth Maps for 3D Shape Completion", arXiv preprint arXiv: 2019, pp. 1-11.
Huang et al., "Consolidation of Unorganized Point Clouds for Surface Reconstruction", http://doi.acm.org/10.1145/1618452.1618522, ACM Transactions on Graphics, vol. 28, No. 5, Article 176, Dec. 2009, pp. 176:1-176:7.
Huang et al., "Edge-Aware Point Set Resampling", DOI 10.1145/2421636.2421645, ACM Transactions on Graphics, vol. 32, No. 1, Article 9, Jan. 2013, pp. 9:1-9:12.
Insafutdinov et al., "Unsupervised Learning of Shape and Pose with Differentiable Point Clouds", arxiv:1810.09381, In Advances in Neural Information Processing Systems (NIPS), 2018, pp. 2802-2812.
Isola et al., "Image-To-Image Translation With Conditional Adversarial Networks", DOI 10.1109/CVPR.2017.632, IEEE Conference on Computer Vision and Pattern Recognition, 2017, pp. 5967-5976.
Karras et al., "Progressive Growing of GANS for Improved Quality, Stability, and Variation", In Proceedings of International Conference on Learning Representations, 2018, pp. 1-26.
Kato et al., "Neural 3D Mesh Renderer", DOI 10.1109/CVPR.2018.00411, IEEE/CVF Conference on Computer Vision and Pattern Recognition, 2018, pp. 3907-3916.
Langguth et al., "Shading-aware Multi-view Stereo", In Proceedings Euro. Conference on Computer Vision, 2016, pp. 1-6.
Li et al., "Differentiable Monte Carlo Ray Tracing through Edge Sampling", https://doi.org/10.1145/3272127.3275109, ACM Transactions on Graphics (Proceedings of Siggraph Asia, vol. 37, No. 6, Article 222, Nov. 2018, pp. 222:1-222:11.
Lin et aL, "Learning Efficient Point Cloud Generation for Dense 3D Object Reconstruction", The Thirty-Second AAAI Conference on Artificial Intelligence (AAAI-18), 2018, pp. 7114-7121.
Lipman et al., "Parameterization-free Projection for Geometry Reconstruction", DOI 10.1145/1239451.1239473, In ACM Transactions on Graphics, vol. 26, No. 3, Article 22, Jul. 2007, pp. 22:1-22:6.
Liu et al., "Material Editing Using a Physically Based Rendering Network", In Proceedings IEEE Conference on Computer Vision and Pattern Recognition, 2017, pp. 2261-2269.
Liu et al., "Paparazzi: Surface Editing by way of Multi-View Image Processing", https://doi.org/10.1145/3272127.3275047, In ACM Transactions on Graphics, vol. 37, No. 6, Article 221, Nov. 2018, pp. 221:1-221:11.
Liu et al., "Solt Rasterizer: A Differentiable Renderer for Image-based 3D Reasoning", arXiv preprint arXiv: 1904.01786, 2019, pp. 1-15.
Loper et al., "OpenDR: An Approximate Differentiable Renderer", In Proceedings Euro. Conference on Computer Vision, 2014, pp. 154-169.
Lu et al., "GPF: GMM-inspired Feature-preserving Point Set Filtering", DOI 10.1109TVCG.2017.2725948, IEEE Transactions Visualization and Computer Graphics, vol. 24, No. 8, Sep. 2016, pp. 2315-2326.
Maier et al., "Intrinsic3D: High-Quality 3D Reconstruction by Joint Appearance and Geometry Optimization with Spatially-Varying Lighting", arxiv:1708.01670, In Proceedings Int. Conference on Computer Vision, 2017, pp. 3114-3122.
Mao et al., "Least Squares Generative Adversarial Networks", In Proceedings Int. Conference on Computer Vision, 2017, pp. 2794-2802.
Nguyen-Phuoc et al., "RenderNet: A deep convolutional network for differentiable rendering from 3D shapes", arXiv:1806.06575, In Advances in Neural Information Processing Systems (NIPS), 2019, pp. 7891-7901.
Öztireli et al., "Feature Preserving Point Set Surfaces based on Non-Linear Kernel Regression", In Computer Graphics Forum (Proc. Of Eurographics), vol. 28, No. 2, 2009, pp. 493-501.
Paszke et al., "Automatic differentiation in PyTorch", In Conference on Neural Information Processing Systems, 2017, pp. 1-4.
Petersen et al., "Pix2Vex: Image-to-Geometry Reconstruction using a Smooth Differentiable Renderer", arXiv preprint arXiv: 1903.11149, 2019, pp. 1-13.
Pfister et al., "Surfels: Surface Elements as Rendering Primitives", In Proceedings Int. Conference on Computer Graphics and Interactive Techniques, 2000, pp. 335-342.
Pontes et al., "Image2Mesh: A Learning Framework for Single Image 3D Reconstruction", arXiv preprint arXiv: 1711.10669, 2017, pp. 1-9.
Qi et al., "PointNet: Deep Learning on Point Sets for 3D Classification and Segmentation", IEEE Conference on Computer Vision and Pattern Recognition, 2017, pp. 1-9.
Qi et al., "PointNet++: Deep Hierarchical Feature Learning on Point Sets in a Metric Space", In Advances in Neural Information Processing Systems (NIPS), 2017, pp. 5099-5108.
Rajeswar et al., "PIX2SCENE: Learning Implicit 3D Representations From a Single Image", ICLR, 2019, pp. 1-16.
Rakotosaona et al., "Pointcleannet: Learning to Denoise and Remove Outliers from Dense Point Clouds", arXiv preprint arXiv: 1901.01060, 2019, pp. 1-17.
Richardson et al., "Learning Detailed Face Reconstruction from a Single Image", DOI 10.1109/CVPR.2017.589, In IEEE Conference on Computer Vision and Pattern Recognition, 2017, pp. 5553-5562.
Ronneberger et al., "U-Net: Convolutional Networks for Biomedical Image Segmentation", arXiv:1505.04597, In Inter. Conf. on Medical image computing and computer-assisted intervention, 2015, pp. 234-241.
Roveri et al., "PointProNets: Consolidation of Point Clouds with Convolutional Neural Networks", DOI: 10.1111/ cgf.13344, In Computer Graphics Forum (Proc. of Eurographics), vol. 37, No. 2, 2018, pp. 87-99.

(56) References Cited

OTHER PUBLICATIONS

Rover et al., "A Network Architecture for Point Cloud Classification via Automatic Depth Images Generation", In Proc. IEEE Conf. on Computer Vision and Pattern Recognition, 2018, pp. 4176-4184.
Sengupta et al., "SfSNet: Learning Shape, Reflectance and Illuminance of Faces in the Wild", In Proceedings of the IEEE Conference on Computer Vision and Pattern Recognition, 2018, pp. 6296-6305.
Shi et al., "Learning Non-Lambertian Object Intrinsics across ShapeNet Categories", In Proc. IEEE Conf. on Computer Vision & Pattern Recognition, 2017, pp. 1685-1694.
Sitzmann et al., "DeepVoxels: Learning Persistent 3D Feature Embeddings", arXiv preprint arXiv: 1812.01024, 2019, pp. 2437-2446.
Sutskever et al., "On the importance of initialization and momentum in deep learning", In Proc. IEEE International Conference on Machine Learning, 2013, pp. 1139-1147.
Tulsiani et al., "Multi-view Supervision for Single-view Reconstruction via Differentiable Ray Consistency", In Proc. IEEE Conference on Computer Vision and Pattern Recognition, 2017, pp. 2626-2634.
Vogels et al., "Denoising with Kernel Prediction and Asymmetric Loss Functions", https://doi.org/10.1145/3197517.3201388, ACM Trans. Graph., vol. 37, No. 4, Article 124, Aug. 2018, pp. 124:1-124:15.
Wang et al., "Mesh Denoising via Cascaded Normal Regression", DOI: http://dx.doi.org/10.1145/2980179.2980232, ACM Trans. Graph., vol. 35, No. 6, Article 232, Nov. 2016, pp. 232:1-232:12.
Xu et al., "Image Smoothing via L0 Gradient Minimization", DOI 10.1145/2024156.2024208, In ACM Transactions on Graphics, vol. 30, No. 6, Article 174, Dec. 2011, pp. 174:1-174:11.
Yan et al., "Perspective Transformer Nets: Learning Single-View 3D Object Reconstruction without 3D Supervision", In Advances in Neural Information Processing Systems (NIPS), 2016, pp. 1696-1704.
Yao et al., "3D-Aware Scene Manipulation via Inverse Graphics", In Advances in Neural Information Processing Systems (NIPS), 2018, pp. 1887-1898.
Yifan et al., "Patch-based Progressive 3D Point Set Upsampling", arXiv preprint arXiv: 1811.11286, 2018, pp. 5958-5967.
Yu et al., "EC-Net: an Edge-aware Point set Consolidation Network", Proc. Euro. Cont. on Computer Vision, 2018, pp. 1-28.
Zhu et al., "Rethinking Reprojection: Closing the Loop for Pose-aware Shape Reconstruction from a Single Image", arXiv:1707.04682, In Proc. Int. Conf. on Computer Vision, 2017, pp. 57-65.
Zwicker et al., "Pointshop 3D: An Interactive System for Point-Based Surface Editing", In ACM Trans. on Graphics, vol. 21, 2002, pp. 322-329.
Zwicker et al., "Surface Splatting", In Proc. Conf. on Computer Graphics and Interactive techniques, SIGGRAPH, Aug. 12-17, 2001, pp. 371-378.
Zwicker et al., "Perspective Accurate Splatting", In Proc. of Graphics interface, Canadian Human-Computer Communications Society, May 17-19, 2004, pp. 247-254.

* cited by examiner

TECHNIQUES FOR PERFORMING POINT-BASED INVERSE RENDERING

CROSS-REFERENCE TO RELATED APPLICATIONS

This application claims the priority benefit of the United States Provisional Patent Application titled "TECHNIQUES FOR PERFORMING POINT-BASED INVERSE RENDERING," filed on Sep. 2, 2019 and having Ser. No. 62/894,947. The subject matter of this related application is hereby incorporated herein by reference.

BACKGROUND

Field of the Various Embodiments

Embodiments relate generally to computer science and computer vision and, more specifically, to techniques for performing point-based inverse rendering.

Description of the Related Art

Neural networks trained to recognize patterns in input data based on example patterns included in training data can be used to solve a wide variety of "computer vision" problems. In computer vision, computers are programmed to infer, analyze, and/or process attributes of three-dimensional ("3D scenes") from digital two-dimensional ("2D") images. Some examples of these types of attributes include, without limitation, coordinates, normals, colors of points, camera position and orientation, and lighting.

For instance, in an iterative training process that includes a forward rendering pass and a backward inverse rendering pass, a neural network can be trained to infer attributes associated with a 3D scene based on a 2D reference image. In the forward rendering pass, a rendering function can be used to generate a 2D image based on a set of inferred attributes. In the backward inverse rendering pass, an error can be computed based on the difference between the generated image and the reference image and optimization operations can be performed on the set of inferred attributes to reduce that error.

With respect to the backward inverse rendering pass, optimizing the inferred attributes may require the rendering function to be differentiable with respect to each of the inferred attributes. For example, gradient descent is one optimization algorithm that computes the values of a set of attributes that minimize an overall error by making incremental modifications to each attribute value in the direction of the descending gradient (i.e., partial derivative) of the error with respect to that attribute. In certain instances, a rendering function may be discontinuous at certain points due to occlusions, where a portion of an object is blocked from view, and edges. Consequently, the partial derivatives of a rendering function with respect to point coordinates and point normals may not be completely defined, and thus disrupts or places limitations on error reduction.

To address the problems caused by the discontinuities seen with such rendering functions, some "differentiable" rendering implementations represent attributes via a polygon mesh and use a simplified, differentiable rendering function. A polygon mesh represents objects using a collection of vertices, edges, and faces. Each vertex has a different location in 3D space, each edge is a connection between two vertices, and each face is a set of edges that make up a polygon. Other differential rendering implementations represent attributes via a polygon mesh and approximate the required gradients of a non-differentiable rendering function.

One drawback of both of these types of differentiable rendering implementations is that the connectivity of the vertices within the polygon meshes is not differentiable and, as a result, the topology of the objects represented by the polygon meshes cannot be modified. Thus, during a backward inverse rendering pass, the object surfaces represented by the polygon meshes cannot be merged or separated. Such a constraint can prevent the topology of a 3D object, such as the number of distinct surfaces, from being changed and therefore properly optimized during a backward inverse rendering pass. Another drawback is that polygon meshes may not specify normals (e.g., point normals, surface normals, vertex normals, etc.) explicitly. Instead, a given face normal is determined by the positions of the associated set of vertices; therefore, the face normal cannot be updated independently of the positions of the associated vertices. Such a constraint prevents the small scale details that are conveyed via normals, such as the lighting of bumps and dents on a particular surface of the represented object, from being optimized properly during a backward inverse rendering pass. Ultimately, when these types of constraints are imposed on the optimizations implemented in the backward inverse rendering pass, the overall effectiveness of the training process and the resulting ability of the trained neural network to accurately and reliably infer 3D geometry, motion, appearance, etc., from 2D images is compromised.

As the foregoing illustrates, what is needed in the art are more effective techniques for determining attributes associated with 3D scenes based on 2D images.

SUMMARY

One embodiment sets forth a computer-implemented method for inferring attributes associated with a three-dimensional (3D) scene. The method includes rendering a first image based on a first plurality of points associated with the 3D scene; generating a first artificial gradient that approximates a change in a first value of a first pixel included in the first image with respect to a change in a first attribute of a first point included in the first plurality of points; and performing one or more optimization operations on the first point based on the first artificial gradient to generate a second plurality of points, where an error associated with the second plurality of points is less than an error associated with the first plurality of points.

At least one technical advantage of the disclosed techniques relative to the prior art is that the disclosed techniques can be used to train neural networks to more efficiently and more reliably solve computer vision problems. In particular, the disclosed techniques are tailored to operate on relatively unstructured point clouds that can represent changes to 3D objects at any scale. For example, connectivity information is not directly represented in point clouds. Accordingly, the disclosed techniques can be used to make topology changes (e.g., merging and/or separating surfaces) when optimizing point clouds during inverse rendering to more accurately represent 3D objects relative to prior art approaches. In another example, the normal of a point can be modified independently of the position of the point, which allows the disclosed techniques to more effectively infer small scale details of 3D objects conveyed via normals, such as the lighting of surface bumps, relative to prior art approaches.

These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
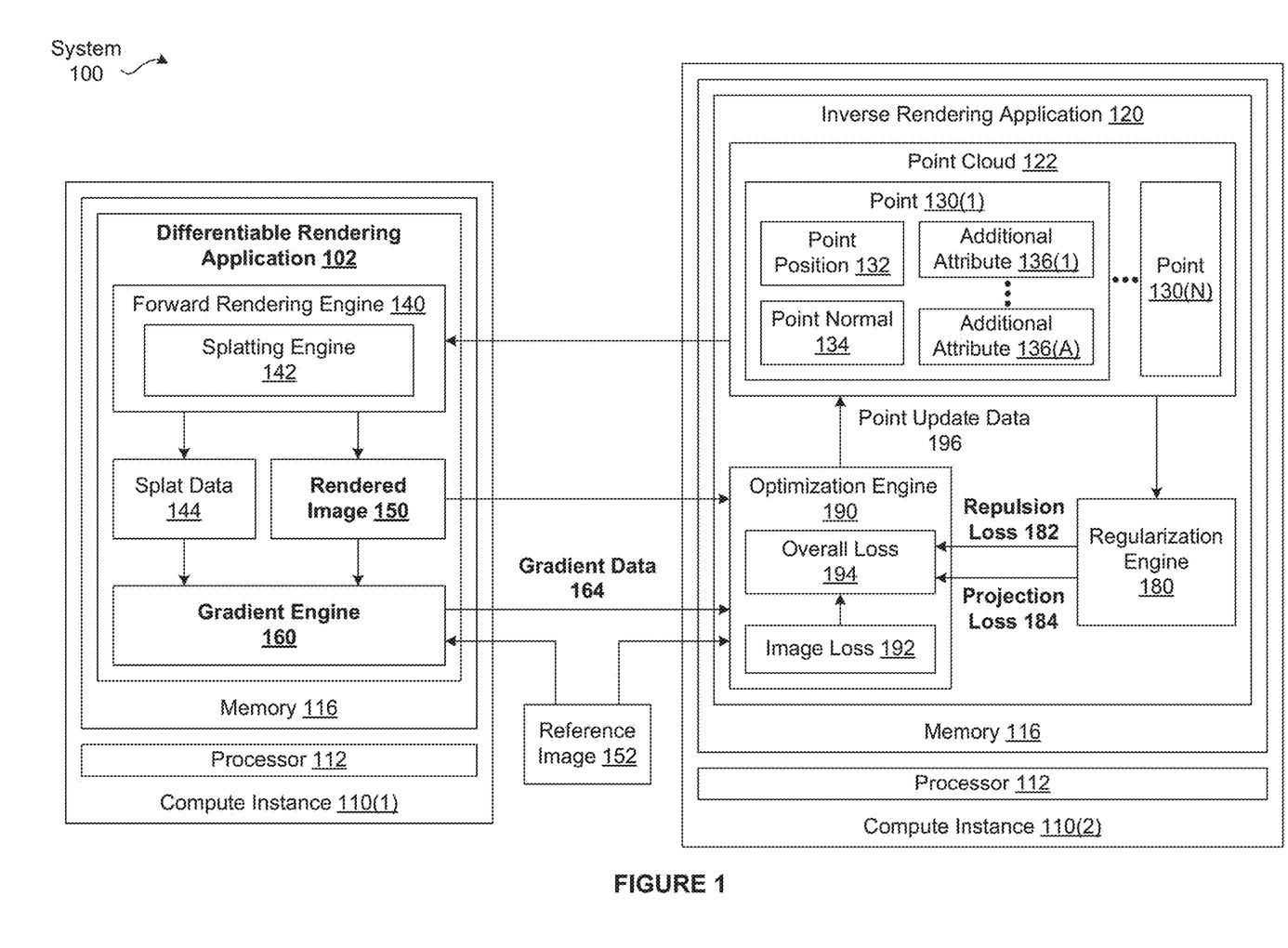
FIG. 1 is a conceptual illustration of a system configured to implement one or more aspects of the various embodiments.

FIG. 1 is a conceptual illustration of a system 100 configured to implement one or more aspects of the various embodiments. The system 100 includes, without limitation, any number of compute instances 110. For explanatory purposes, multiple instances of like objects are denoted with reference numbers identifying the object and parenthetical numbers identifying the instance where needed.

Any number of the components of the system 100 may be distributed across multiple geographic locations or implemented in one or more cloud computing environments (i.e., encapsulated shared resources, software, data, etc.) in any combination. In alternate embodiments, the system 100 may include any number of compute instances 110 in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("GPU"), a controller, a micro-controller, a state machine, or any combination thereof. The memory 116 stores content, such as software applications and data, for use by the processor 112 of the compute instance 110. In alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

Each of the compute instances 110 is configured to implement one or more applications or subsystems of applications. For explanatory purposes only, each application is depicted as residing in the memory 116 of a single compute instance 110 and executing on a processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instances 110 implement an iterative "computer vision" training process which can be used to train neural networks to infer any number and type of attributes of 3D scenes from 2D images. Some examples of these types of attributes include, without limitation, coordinates, normals, colors of points, camera position and orientation, and lighting The 3D scene may include, without limitation, any number of 3D objects and is associated with a coordinate space referred to herein as a "source space." The source space is also commonly referred to as an "object space." The 2D image includes, without limitation, any number of pixels, where each pixel is associated with a different discrete location in a coordinate space referred to herein as "screen space." Pixels in the screen space lie on an image plane.

In some previously used training processes, the attributes are represented via a polygon mesh of vertices. In a forward rendering pass, a differentiable rendering engine uses a rendering function to generate a rendered image 150 based on a set of inferred attributes. As persons skilled in the art will recognize, optimizing the inferred attributes may require the rendering function to be differentiable with respect to each of the inferred attributes. Accordingly, the differentiable rendering engine either implements a simplified, differentiable rendering function or approximates the required gradients of a non-differentiable rendering function. In a backward inverse rendering pass, an inverse rendering engine computes an error based on a distance (i.e., difference) between the rendered image 150 and a reference image 152. Subsequently, the inverse rendering engine performs optimization operations on the polygon mesh to reduce the error. The inverse rendering engine uses the actual derivatives of the simplified, differentiable rendering function or the approximate gradients of the non-differentiable rendering function to perform the optimization operations.

As described previously herein, one drawback of these types of previously used training processes is that the structure of the polygon mesh imposes constraints on the optimizations implemented in the backward inverse rendering pass. As a result of these constraints, the overall effectiveness of the training process and the resulting ability of the trained neural network to accurately and reliably infer 3D geometry, motion, appearance, etc., from 2D images is compromised.

Performing Differentiable Rendering Using Point Clouds

To address the above problems, the compute instance 110(1) implements a differentiable rendering application 102 that generates the rendered image 150 and gradient data 164 based on a point cloud 122 that represents a 3D scene. Further, the compute instance 110(2) implements an inverse rendering application 120 that performs optimization operations on the point cloud 122 based on the gradient data 164.

The point cloud 122 includes, without limitation any number of points 130 that represent any number of 3D objects included in the 3D scene. Each of the points 130 includes, without limitation, a point position 132, a point normal 134, and any number and type of additional attributes 136 associated with the 3D scene. The point position 132($k$) and the point normal 134($k$) are attributes associated with the 3D scene that specify, respectively, the 3D coordinates and the normal of the point 130($k$) in a source space. The point cloud 122 does not explicitly specify any connectivity and the point position 132($k$) is independent of the point normal 134($k$).

Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

In particular and for explanatory purposes only, various differentiable rendering techniques and various inverse rendering techniques are described in the context of the differentiable rendering application 102, the inverse rendering application 120, and the reference image 152. However, any number of the techniques described herein may be used in any number of software applications in any technically feasible fashion to perform differentiable rendering, inverse rendering, and/or train any number and type of applications to optimize any number of point clouds 122 based on any number of reference images 152. For instance, in some embodiments, the differentiable rendering application 102 is used to train a neural network to solve a computer vision problem using reference images 152 corresponding to different views of a 3D scene, and the inverse rendering application 120 is omitted from the system 100. In the same or other embodiments, the neural network may implement any number of the inverse rendering techniques described herein.

As shown, the differentiable rendering application 102 resides in the memory 116 of the computer instance 110(1) and executes on the processor 112 of the computer instance 110(1). As also shown, the inverse rendering application 120 resides in the memory 116 of the computer instance 110(2) and executes on the processor 122 of the computer instance 110(2). The point cloud 122 is included in the inverse rendering application 120. In alternate embodiments, the differentiable rendering application 102 and the inverse rendering application 120 may reside in any number (including one) and type of memories and execute on any number of processors 122 in any combination. In the same or other embodiments, the point cloud 122 may be stored in any memory independently of the inverse rendering application 120.

The differentiable rendering application 102 includes, without limitation, a forward rendering engine 140, splat data 144, the rendered image 150, and a gradient engine 160. As described in greater detail below, a "splat" is the projection of an elliptical Gaussian representing a given point 130 in object space onto screen space after truncation to bounded support as per equation (3) (also below). The forward rendering engine 140 includes, without limitation, a splatting engine 142 that performs screen space elliptical weighted average ("EWA") filtering operations on the point cloud 122 to generate the rendered image 150 and the splat data 144.

To initiate a forward pass, the splatting engine 142 applies an isotropic Gaussian filter to any number of the attributes w of each of the points 130($k$) in the tangent plane. The tangent plane for the point 130($k$) is defined by the point normal 134($k$) at the point 130($k$). Examples of point attributes w of the point 130($k$) include, without limitation, albedo color, shading, depth value, the point position 132($k$), the point normal 134($k$), etc. For instance, in some embodiments, the splatting engine 142 applies the isotropic Gaussian filter to the point attributes w corresponding to shading under three orthogonally positioned RGB colored sunlight. In such embodiments, w carries strong information about the point normal 134($k$) independently of the point position 132($k$).

For the point 130($k$) included in the point cloud 122, the splatting engine 142 computes a filter weight of the isotropic Gaussian filter at a position p using the following equations (1a) and (1b):

$$\mathcal{G}_{p_k, V_k}(p) = \frac{1}{2\pi|V_k|^{\frac{1}{2}}} e^{(p-p_k)^T V_k^{-1}(p-p_k)} \tag{1a}$$

$$V_k = \sigma_k^2 I \tag{1b}$$

In equations (1a) and (1b), $p_k$ is the point position 132($k$) of the point 130($k$), $V_k$ is the variance, $\sigma_k$ is the standard deviation, and I is the identity matrix.

The splatting engine 142 then projects the resulting Gaussian weights to screen space. More precisely, the splatting engine 142 projects the point position 132($k$) $p_k$ and the position p to, respectively, a projected point position $x_k$ and a pixel position x. At the pixel position x, the splatting engine 142 computes a screen space elliptical Gaussian weight $r_k$ using the following equation (2):

$$r_k(x) = \mathcal{G}_{V_k}(J_k^{-1}(x - x_k)) = \frac{1}{|J_k^{-1}|} \mathcal{G}_{J_k C_k J_k^T}(x - x_k) \tag{2}$$

In equation (2), $J_k$ is the Jacobian of the projection from the tangent plane to the image plane and is determined by the point position 132($k$) (denoted as $p_k$) and the point normal 134($k$) denoted as ($n_k$). Consequently, the screen space elliptical Gaussian weight $r_k$(x) is determined by the point position 132($k$) $p_k$ and the point normal 134($k$) $n_k$. The projection expressed via equation (2) defines an elliptical Gaussian. The elliptical Gaussian is also referred to herein as an "ellipse" corresponding to the point 130(k) at the point position 132(k) $p_k$.

Subsequently, the splatting engine 142 convolves a low-pass Gaussian filter with equation (2) in screen space. The resulting elliptical Gaussian is also referred to herein as a "splat" corresponding to the point 130(k) at the point position 132(k) $p_k$, and can be represented as the following equation (3):

$$\bar{\rho}_x(x) = \frac{1}{|J_k^{-1}|} \mathcal{G}_{J_k V_k J_k^T + I}(x - x_k) \quad (3)$$

As persons skilled in the art will recognize, equation (3) is fully differentiable. However, to efficiently and accurately compute the pixel values, the splatting engine 142 introduces two sources of discontinuity into equation (3). To enable efficient computations of the pixel values, the splatting engine 142 limits the computations performed for ellipses in the image plane for all of the pixel positions x that lie outside a cutoff radius C. The splatting engine 142 may determine the cutoff radius C in any technically feasible fashion. For instance, in some embodiments, the splatting engine 142 determines C using the following equation (4):

$$\frac{1}{2} x^T (J V_k J^T + I) x > C \quad (4)$$

The splatting engine 142 also sets the Gaussian weights for any number of occluded points 130 to zero. The splatting engine 142 may determine the occluded points in any technically feasible fashion. For instance, in some embodiments, the splatting engine 142 maintains a list of the A (e.g., 5) closest points 130 to each of the pixel positions. For each of the closest points 130(a), the splatting engine 142 computes the depth difference between the depth of the point 130(a) and the depth of the front-most point 130 in the list. If the depth difference is greater than a threshold T (e.g., 1% of the bounding box diagonal length), then the splatting engine 142 sets the Gaussian weight of the point 130(a) to zero.

For the point 130(k) at the point position 132(k) $p_k$, a resulting "truncated Gaussian weight" $\rho_k$ can be expressed as the following equation (5):

$$\rho_k(x) = \begin{cases} 0, & \text{if } \frac{1}{2} x^T (J V_k J^T + I) x > C, \\ 0, & \text{if } p_k \text{ is occluded,} \\ \bar{\rho}_k, & \text{otherwise.} \end{cases} \quad (5)$$

The truncated Gaussian weight $\rho_k$ is also referred to herein as a "discontinuous rasterization function." The splatting engine 142 computes the final pixel value at pixel position x, denoted herein as $I_x$, as the normalized sum of all filtered point attributes $w_k$, where k ranges from 0 to N. Accordingly, the final value of the pixel at pixel position x can be expressed as the following equation (6):

$$I_x = \frac{\sum_{k=0}^{k=N} \rho_k(x) w_k}{\sum_{k=0}^{k=N} \rho_k(x)} \quad (6)$$

Equation (6) is also referred to herein as the "rendering function." In some embodiments, to increase efficiency, the splatting engine 142 optimizes equation (6) by computing the bounding box of each ellipse and only considering the points 130 corresponding to ellipses that cover the pixel at the pixel position x.

The splatting engine 142 computes the rendered image 150 using equation (6). The splatting engine 142 then transmits the rendered image 150 and the splat data 144 to the gradient engine 160. The splat data 144 includes, without limitation, any amount and type of information about any number of the ellipses and the splats generated during the forward pass.

Subsequently, the gradient engine 160 initiates a backward pass. As described in greater detail in conjunction with FIGS. 2 and 3, the gradient engine 160 computes the gradient data 164 based on the splat data 144, the rendered image 150, and the reference image 152. The gradient data 164 includes, without limitation, gradients for any number of pixel values with respect to any number of points 130. Each gradient includes, without limitation, an approximate partial derivative of the pixel value with respect to the point position 132(k) and an approximate partial derivative of the pixel value with respect to the point normal 134(k). Notably, to generate the gradient for the pixel value with respect to the point 130(k), the gradient engine 160 implements continuous approximations of the discontinuities associated with the truncated Gaussian weight $\rho_k$. The gradient engine 160 then transmits the gradient data 164 to the inverse rendering application 120.

The inverse rendering application 120 includes, without limitation, an optimization engine 190, a regularization engine 180, and the point cloud 122. During each backward pass, the optimization engine 190 performs any number of optimization operations on any number of the attributes of any number of the points 130 included in the point cloud 122. Importantly, the optimization engine 190 independently optimizes the point positions 132 and the point normals 134. Further, the optimization engine 190 does not necessarily optimize the same attributes during each pass. For instance, in some embodiments, the optimization engine 190 modifies the point normals 134 during Tn passes and modifies the point positions 132 during Tp subsequent passes.

As shown, the optimization engine 190 includes, without limitation, an image loss 192 and an overall loss 194. The image loss 192 is a value for a metric that measures a distance (i.e., difference) between the rendered image 150 and the reference image 152. The optimization engine 190 computes the image loss 192 based on an image loss function (not shown). The image loss function may be any type of function and may be expressed in any technically feasible fashion.

For instance, in some embodiments, the optimization engine 190 computes the image loss 192 using a Symmetric Mean Absolute Percentage loss function $\mathcal{L}_I$ that can be expressed as the following equation (7):

$$\mathcal{L}_I = \frac{1}{HW} \sum_{x \in I} \sum_{c}^{C} \frac{|I_{x,c} - I^*_{x,c}|}{|I_{x,c}| + |I^*_{x,c}| + \epsilon} \quad (7)$$

The overall loss 194 is a value for an error metric that the optimization engine 190 is configured to minimize in order to optimize the attributes. The optimization engine 190 computes the overall loss 194 based on an overall cost function (not shown). The overall loss function may be any type of function and may be expressed in any technically feasible fashion. Further, the optimization engine 190 may compute the overall loss function based on any number of different rendered images 150, where each rendered image 150 corresponds to a different view of a 3D scene.

For instance, in some embodiments, the optimization engine 190 implements an overall loss function that is a weighted sum of the image loss function, a repulsion loss term, and a projection loss term computed over V views. Because any number of configurations of attributes can result in the same rendered image 150, the regulation engine 180 defines the repulsion loss term and the projection loss term to guide the optimization engine 190 to favor relatively plausible configurations of the point cloud 122. The repulsion loss term and the projection loss term are also referred to herein as regularization terms.

Accordingly, the overall loss function can be express as the following equation (8):

$$\sum_{v=0}^{V} \mathcal{L}(I_v, I^*_v) \sum_{v=0}^{V} \mathcal{L}_I(I_v, I^*_v) + \Upsilon_p \mathcal{L}_p + \Upsilon_r \mathcal{L}_r \quad (8)$$

In equation (8), $\mathcal{L}_r$ is the repulsion loss term, $\mathcal{L}_p$ is the projection loss term, $\Upsilon_r$ is a repulsion loss weight (e.g., 0.05), and $\Upsilon_p$ is a projection loss weight (e.g., 0.02). Notably, the repulsion loss term and the projection loss term are dependent on the point cloud 122 but not the rendered image 150. As shown, the optimization engine 190 receives a repulsion loss 182 and a projection loss 184 from the regularization engine 180. The repulsion loss 182 and the projection loss 184 are values for, respectively, the repulsion loss term for the point cloud 122 and the projection loss term for the point cloud 122. The regularization engine 180 is described in greater detail in conjunction with FIG. 4. In alternate embodiments, the regularization engine 180 and/or the optimization engine 190 may implement any number and type of regularization terms.

In general, optimizing the repulsion loss term facilitates uniform point distributions by maximizing the distances between the neighbors of the point 130(k) selected for optimization on a local projection plane. By contrast, optimizing the projection loss term preserves clean surfaces by minimizing the distance from the point 130(k) selected for optimization to the surface tangent plane. In alternate embodiments, the regularization engine 180 and/or the optimization engine 190 may implement any number and type of regularization terms.

After performing the optimization operations for the current backward pass, the optimization engine 190 generates point update data 196 that specifies any number of modifications to the point cloud 122. The inverse rendering application 120 then updates any number of the point positions 132, point normals 134, and additional attributes 136 as per the point update data 196. Subsequently, the inverse rendering application 120 transmits the updated point cloud 122 to the differentiable rendering application 102. In response, the differentiable rendering application 102 initiates a new forward pass.

The differentiable rendering application 102 and the inverse rendering application 120 continue to work together to optimize the point cloud 122 until any technically feasible completion criterion is met. The differentiable rendering application 102 and/or the inverse rendering application 120 may determine that the completion criterion is met in any technically feasible fashion. For instance, in some embodiments, the completion criterion is a loss threshold and the differentiable rendering application compares the overall loss 194 to the loss threshold to determine whether to initiate a new forward pass.

It will be appreciated that the system shown herein is illustrative and that variations and modifications are possible. The connection topology, including the number, location, and arrangement of the differentiable rendering application 102, the inverse rendering application 120, the point cloud 122, and the reference image 150 may be modified as desired. In certain embodiments, one or more components shown in FIG. 1 may not be present.

Note that the techniques described herein are illustrative rather than restrictive, and may be altered without departing from the broader spirit and scope of the embodiments. In particular, the differentiable rendering application 102 and the inverse rendering application 120 may be implemented across any number (including one) of software applications in any combination. For instance, in some alternate embodiments, portions of the differentiable rendering application 102 and the inverse rendering application 120 may be implemented in a single neural network. Further, in various embodiments, any number of the techniques disclosed herein may be implemented while other techniques may be omitted in any technically feasible fashion.

Computing Gradients for the Rendering Function

Figure 2:
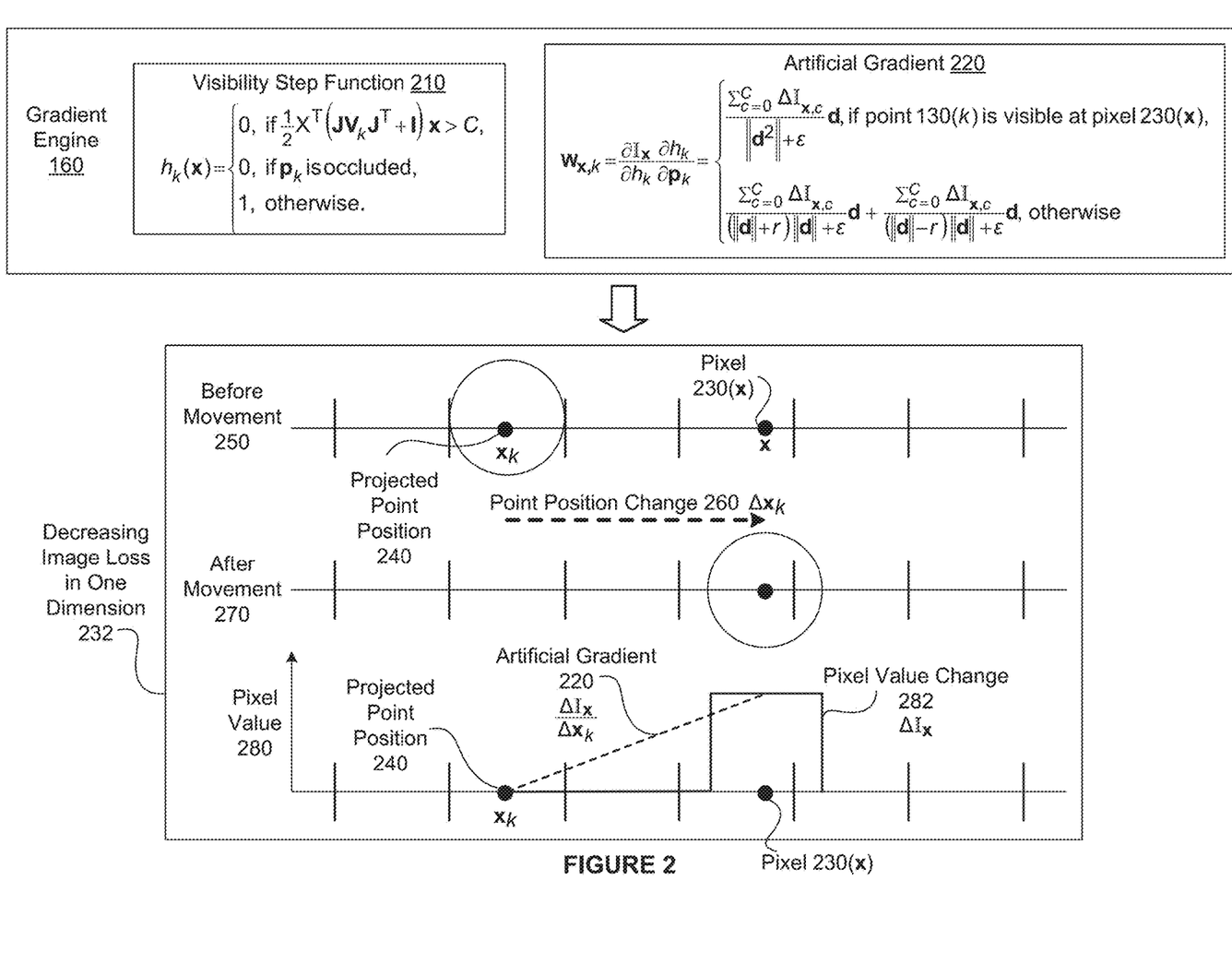
FIG. 2 illustrates how the gradient engine of FIG. 1 generates an artificial gradient, according to various embodiments.

FIG. 2 illustrates how the gradient engine 160 of FIG. 1 generates an artificial gradient 220, according to various embodiments. As shown, the gradient engine 160 includes, without limitation, a visibility step function 210 and the artificial gradient 220. For explanatory purposes only, a pixel 230(x) denotes the pixel 230 located at the position x in screen space.

As described previously herein, the discontinuity in the rendering function is encapsulated in the truncated Gaussian weights p as per equation (5). To allow efficient and automatic differentiation of the truncated Gaussian weights ρ, the gradient engine 160 factorizes the discontinuous truncated Gaussian weights ρ into a fully differentiable term $\bar{\rho}$ and the visibility step function 210 h $\Box$ {0, 1}. For the point 130(k) at the position 132(k) $p_k$, the discontinuous truncated Gaussian weight $\rho_k$ can be expressed using the following equations (9a) and (9b):

$$\rho_k = h_k \bar{\rho}_k \quad (9a)$$

$$h_k(x) = \begin{cases} 0, & \text{if } \frac{1}{2} x^T (JV_k J^T + 1) x > C, \\ 0, & \text{if } p_k \text{ is occluded,} \\ 1, & \text{otherwise.} \end{cases} \quad (9b)$$

Because the number of pixels 230 around the ellipse for which the point normal 134(k) $n_k$ impacts the visibility is relatively small compared to the number of pixels 230 around the ellipse for which the point position 132 $p_k$ impacts the visibility, the gradient engine 160 implements the following approximation (10):

$$\frac{\partial h_k}{\partial n_k} = 0 \qquad (10)$$

Consequently, the visibility step function 210 is solely determined by the point position 132 $p_k$, and a pixel value 280 of the pixel 230(x) can be written as a function of the associated attribute $w_k$, the associated fully differentiable term $\bar{\rho}_k$, and the visibility step function 210 $h_k(x)$. The pixel value 280 of the pixel 230(x) is denoted herein as $I_x$. Using the chain rule, the gradient of the pixel value 280 of the pixel 230(x) with respect to the point 130(k), can be expressed as the following equations (11a) and (11b):

$$\frac{\partial I_x(w_k, \bar{\rho}_k, h_k)}{\partial p_k} = \frac{\partial I_x}{\partial w_k}\frac{\partial w_k}{\partial p_k} + \frac{\partial I_x}{\partial \bar{\rho}_k}\frac{\partial \bar{\rho}_k}{\partial p_k} + \frac{\partial I_x}{\partial h_k}\frac{\partial h_k}{\partial p_k} \qquad (11a)$$

$$\frac{\partial I_x(w_k, \bar{\rho}_k, h_k)}{\partial n_k} = \frac{\partial I_x}{\partial w_k}\frac{\partial w_k}{\partial n_k} + \frac{\partial I_x}{\partial \bar{\rho}_k}\frac{\partial \bar{\rho}_k}{\partial n_k} \qquad (11b)$$

Note that in equation (11a), $$\frac{\partial h_k}{\partial p_k}$$

is undefined at the edges of ellipses due to occlusion.

To construct the gradient of the pixel value 280 of the pixel 230(x) with respect to the point 130(k) despite the discontinuity of the visibility step function 210 $h_k(x)$, the gradient engine 160 defines the artificial gradient 220 $W_{x,k}$ to replace the joint term $$\frac{\partial I_x}{\partial h_k}\frac{\partial h_k}{\partial p_k}.$$

As persons skilled in the art will recognize, the additional color information conveyed in $$\frac{\partial I_x}{\partial h_k}$$

allows the gradient engine 160 to define gradients only in the direction that decreases the image loss 192. The gradient engine 160 approximates the discontinuous function of the pixel value 280 $I_x$ with respect to the point position 132 $p_k$ with a continuous linear function. Subsequently, the gradient engine 160 defines the gradient for the pixel value 280 $I_x$ with respect to the point position 132 $p_k$ as $$\frac{\Delta I_x}{\Delta x_k},$$

where $\Delta I_x$ denotes the change in pixel value 280 $I_x$ and $\Delta x_k$ denotes the change in a projected point position 240 corresponding to the point position 132 $p_k$. As referred to herein, when the point 130(k) is projected from source space to screen space, the resulting projected point lies at the projected point position 240 $x_k$. The change in the pixel value 280 is also referred to herein as a pixel value change 282, and the change in the projected point position 240 is also referred to herein as a point position change 260.

For explanatory purposes only, an example of the gradient for the pixel value 280 $I_x$ with respect to the point position 132 $p_k$ for a one-dimensional scenario in which an ellipse associated with the point 130(k) is not initially visible at the pixel 230(x) is depicted as part of an example denoted "decreasing image loss in one dimension" 232. As persons skilled in the art will recognize, the artificial gradient 220 $W_{x,k}$ expresses the pixel value change 282 when varying the point position 132 $p_k$, assuming that the shape and colors of the associated ellipse are fixed. Assuming that the shape and colors of the associated ellipse are fixed is justified for sunlight diffuse shading.

In general, whenever the pixel value change 282 resulting from the movement of the point position 132 $p_k$ can decrease the image loss 192, the gradient engine 160 generates the artificial gradient 220 that pushes the point 130(k) in the corresponding direction. Scenarios for which the pixel value change 282 $\Delta I_x$ resulting from the movement of the point 130(k) can decrease the image loss 192 satisfy the following equation (12):

$$\Delta I_x \frac{\partial \mathcal{L}_I}{\partial I_x} < 0 \qquad (12)$$

As depicted with the dotted line, the gradient engine 160 generates a linear approximation to the discontinuous function of the pixel value 280 $I_x$ with respect to the point position 132 $p_k$ and therefore the associated projected point position 240. Based on the linear approximation, the gradient engine 160 defines the artificial gradient 220 as $$\frac{\Delta I_x}{\Delta x_k}.$$

As shown, before movement 250, the projected point corresponding to the point 130(k) at the point position 132 $p_k$ lies at the projected point position 240 $x_k$. The artificial gradient 220 pushes the point 130(k). After movement 270, the projected point lies the point position change 260 ($\Delta x_k$) to the right of the original projected point position 240 $x_k$. Furthermore, as a result of the movement of the splat associated with the point 130(k), the pixel value 280 of the pixel 230(x) increases by the pixel value change 282 $\Delta I_x$.

Figure 3:
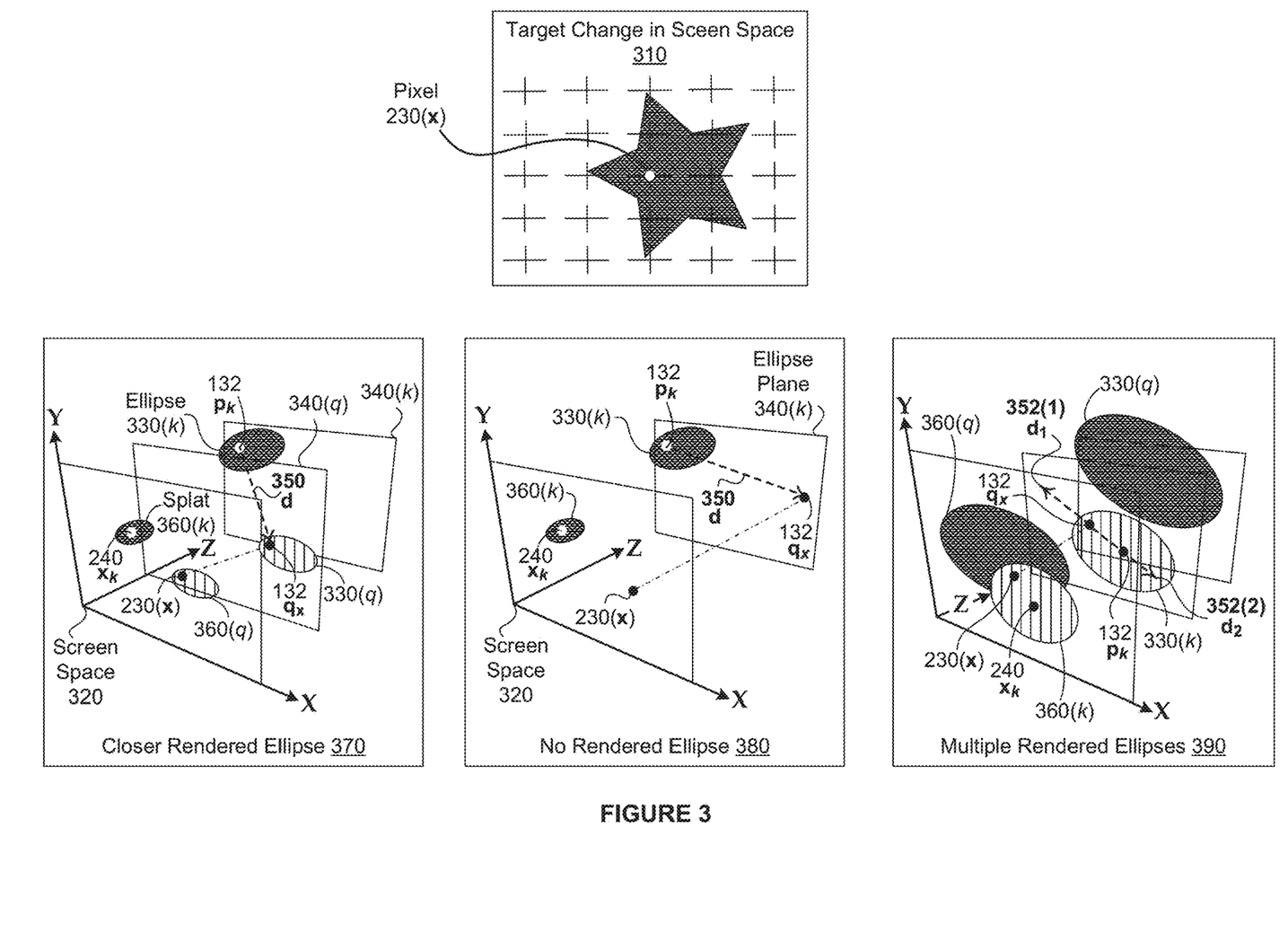
FIG. 3 illustrates how the gradient engine of FIG. 2 determines gradient directions for different exemplary scenarios, according to various embodiments.

As described in greater detail in conjunction with FIG. 3, as part of generating the artificial gradient 220, the gradient engine 160 determines a translation vector d based on the following equation (13):

$$d = q_x - p_k \qquad (13)$$

Assuming that the pixel values 280 have C channels, the gradient engine 160 defines the artificial gradient 220 using the following equation (14):

$$w_{x,k} = \begin{cases} \dfrac{\sum_{c=0}^{C} \Delta I_{x,c}}{\|d^2\| + \varepsilon} d, & \text{if point } 130(k) \text{ is visible at pixel } 230(x), \\ \dfrac{\sum_{c=0}^{C} \Delta I_{x,c}}{(\|d\| + r)\|d\| + \varepsilon} d + \dfrac{\sum_{c=0}^{C} \Delta I_{x,c}}{(\|d\| - r)\|d\| + \varepsilon} d, & \text{otherwise} \end{cases} \quad (14)$$

In equation (14), r is the distance between the point position 132 $p_k$ and the edge of the ellipse. As persons skilled in the art will recognize, the impact that the point 130(k) has on the pixel 230(x) decreases as the point position change 260 increases. The value ε is a relatively small constant (e.g., 0.01) that prevents the artificial gradient 220 from becoming extremely large when $p_k$ and $q_x$ are relatively close, thereby preventing overshooting, oscillation and other convergence problems that can be associated with extremely large gradients.

To increase accuracy when computing the pixel value change 282, the gradient engine 160 evaluates equation (6) after moving the point 130(k) while taking into account currently occluded ellipses. The gradient engine 160, the splatting engine 142, and/or the forward rendering engine 140 may track the currently occluded ellipses in any technically feasible fashion. For instance, in some embodiments and for each of the pixels 230, the splatting engine 142 caches an ordered list of ellipse data for the top T (e.g., 5) closest ellipses that can be projected to the pixel 230. The ellipse data includes, without limitation, the discontinuous truncated Gaussian weights ρ, the attributes $w_k$, and depth values.

For each pass, the gradient engine 160 may compute any amount of gradient data 164 for any number and permutations of points 130, pixels 230, point attributes, and point values 280. Advantageously, because the rendering function is relatively simple, the gradient engine 160 can compute the gradient data 164 analytically. Furthermore, the gradient engine 160 evaluates the movement of the points 130 in 3D space and, consequently, the optimization engine 190 can subsequently optimize in the depth dimension using any number (including one) of views. In addition, the gradient engine 160 computes the gradient for all dimensions of the point 130 jointly. Importantly, the gradient engine 160 computes each pixel value change 282 for the pixel 230(x) using a set of occluded and occluding ellipses projected to the pixel 230(x). As a result, the accuracy of the gradient values is increased and the optimization engine 190 is encouraged to move noisy points 130 inside the point cloud 122 onto the surface of the point cloud 122 to positions corresponding to similar pixel values 280.

FIG. 3 illustrates how the gradient engine 160 of FIG. 2 determines translation vectors 350 for different exemplary scenarios, according to various embodiments. For explanatory purposes only, a target change in screen space 310 depicts the negative gradient of the image loss 192 with respect to the pixel value 280, denoted as $$-\frac{\partial \mathcal{L}_I}{\partial I}.$$

Visually, the target change in screen space 310 depicts the color change for each pixel 230 of a grayscale rendered image 150 that would decrease the image loss 192. If the pixels 230 depicted in dark gray were to become darker, then the rendered image 150 would become more similar to the reference image 152 of a star.

FIG. 3 depicts three different exemplary scenarios and the associated translation vectors 350 used to compute the artificial gradient 220 $W_{x,k}$ for the point 130(k) from the image loss 192 at the pixel 230(x). The point 130(k) has the point position 132 $p_k$ and the projected point position 240 $x_k$. An ellipse 330(k) represents the elliptical Gaussian associated with the point 130(k) and is depicted relative to an ellipse plane 340(x) that is orthogonal to the principal axis. A splat 360(k) represents the ellipse 330(k) after convolution with the low-pass Gaussian filter in screen space.

A closer rendered eclipse 370 depicts a scenario in which the darker ellipse 330(k) is not visible at the pixel 230(x) and the pixel 230(x) is rendered by another ellipse 330 or multiple, lighter ellipses 330 that are in front of the ellipse 330(k). Note that moving the darker splat 360(k) to cover the pixel 230(x) would darker the pixel 230(x). Accordingly, the gradient engine 160 sets $q_x$ equal to the intersection of the viewing ray with the front-most ellipse 330(q) that is rendered at the pixel 230(x). The gradient engine 160 then defines the translation vector 350 d in the $q_x$-$p_k$ direction.

No rendered ellipse 370 depicts a scenario in which the darker ellipse 330(k) is not visible at the pixel 230(x) and none of the ellipses 360 are rendered at the pixel 230(x) or the currently rendered ellipse(s) 360 are behind the darker ellipse 330(k). As shown, the gradient engine 160 sets $q_x$ equal to the intersection of the viewing ray with the ellipse plane 340(k). The gradient engine 160 then defies the translation vector 350 d in the $q_x$-$p_k$ direction.

Multiple rendered ellipses 390 depicts a scenario in which the lighter ellipse 330(k) is at least partial visible at the pixel 230(x). As shown, $q_x$ is the intersection of the viewing ray with the darker ellipse 330(q). Note that moving the lighter ellipse 330(k) towards $q_x$ would reveal the darker ellipse 330(q) and would therefore darken the pixel 230(x). Similarly moving the lighter ellipse 330(k) away from $q_x$ would reveal the darker ellipse 330(q) and would therefore darken the pixel 230(x). Because either movement would darken the pixel 230(x), the gradient engine 160 determines a translation option 352(1) $d_1$ and a translation option 352(2) $d_2$ in opposite directions. The gradient engine 160 then defines the translation vector 350 d as the average of the translation option 352(1) $d_1$ and the translation option 352(2) $d_2$.

In alternate embodiments, the gradient engine 160 may determine the translation vector 350 in any technically feasible fashion and for any number of different types of scenarios.

Surface Regularization

Figure 4:
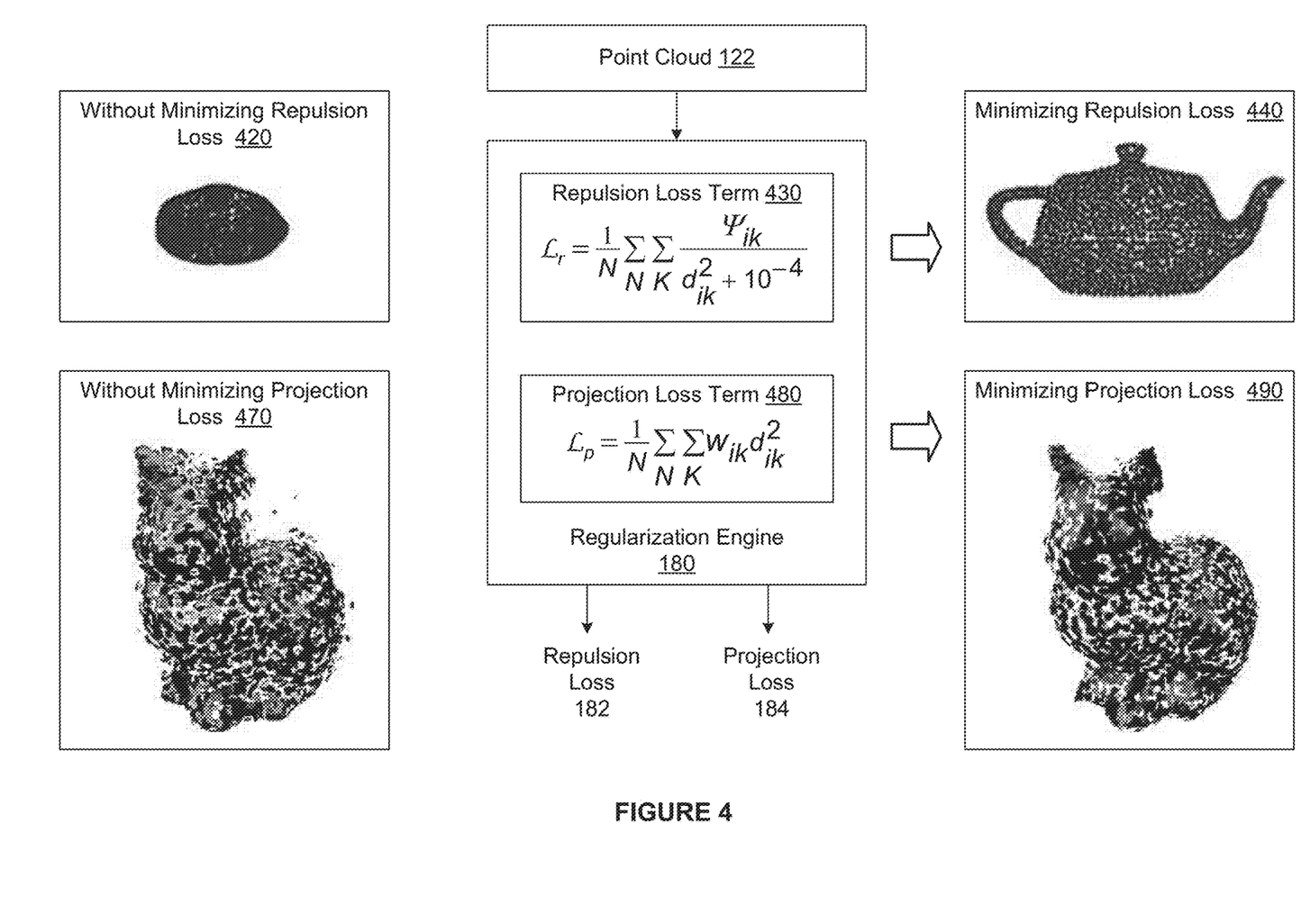
FIG. 4 is a more detailed illustration of the regularization engine of FIG. 1, according to various embodiments.

FIG. 4 is a more detailed illustration of the regularization engine 180 of FIG. 1, according to various embodiments. As shown, the regularization engine 180 includes, without limitation, a repulsion loss term 430 and a projection loss term 480. The repulsion loss term 430 and the projection loss term 480 are also referred to herein as "surface regularization terms." The repulsion loss term 430, the projection loss term 480, and an image loss term (not shown) are included in the overall loss function (not shown) that the optimization engine 190 uses to optimize the attributes of the points 130.

As persons skilled in the art will recognize, without appropriate regularization, high degrees of freedom associated with optimization operations and/or the targets of optimization operations (e.g., the point locations 132 and the point normals 134) can cause optimization errors. The repulsion loss term 430 and the projection loss term 480 reduce the likelihood that the lack of structure inherent in the point cloud 122 adversely impacts the optimization operations performed by the optimization engine 190.

To encourage relatively uniform distributions of the points 130, the repulsion loss term 430 is minimized for the point 130($k$) when the distances between the point 130($k$) and the points 130 neighboring the point 130($k$) on a local projection plane are maximized. In operation, when the optimization engine 190 performs optimization operations on an attribute associated with the point 130($k$), the repulsion loss term 430 encourages the optimization engine 190 to maximize the distance between the point 130($k$) and the neighbors of the point 130($k$) on the local projection plane.

For explanatory purposes only, "without minimizing repulsion loss" 420 depicts an exemplary shape that the optimization engine 190 could generate if the repulsion loss term 430 were not included in the overall loss function. As shown, if the repulsion loss term 430 were not included in the overall loss function, then the optimization engine 190 could cluster the points 130 at a common local minimum that lies at the center of the reference shape. As referred to herein, the "reference shape" is the shape of a 3D object corresponding to at least a portion of the reference image 152. The center of the reference shape is a common local minimum because the gradients from the surrounding pixels 230 cancel each other out. By contrast and as depicted in "minimizing repulsion loss" 440, because the repulsion loss term 430 is included in the overall loss function, the optimization engine 190 spreads the points 130 relatively evenly inside the silhouette of the reference shape (a teapot).

To encourage the preservation of clean surfaces, the projection loss term 480 is minimized for the point 130($k$) when the distance between the point 130($k$) and the surface tangent plane is minimized. In operation when the optimization engine 190 performs optimization operations on an attribute associated with the point 130($k$), the projection loss term 480 encourages the optimization engine 190 to minimize the distance between the point 130($k$) and the surface tangent plane.

For explanatory purposes only, "without minimizing propulsion loss" 470 depicts an exemplary shape that the optimization engine 190 could generate if the projection loss term 480 were not included in the overall loss function. As shown, if the projection loss term 480 were not included in the overall loss function, then the optimization engine 190 could scatter the points 130 within and outside the surface of the reference shape. By contrast and as depicted in "minimizing propulsion loss" 490, because the repulsion loss term 480 is included in the overall loss function, the optimization engine 190 moves the points 130 to define a relatively clean and relatively smooth surface corresponding to the reference shape (a rabbit).

Computing the repulsion loss term 430 and the projection loss term 480 involves determining a reliable surface tangent plane. As persons skilled in the art will recognize, during optimization (and particularly during multi-view joint optimization), intermediate point clouds 122 can be noisy and include many occluded points 130. Accordingly, in some embodiments, the regularization engine 180 uses weighted Principal Component Analysis ("PCA") to penalize occluded inner points. More precisely, since occluded points 130 are more likely than other points 130 to be outliers inside a shape, a visibility weight is used to penalize occluded points 130. The visibility weight is added to commonly implemented bilateral weights that consider both the point-to-point Euclidean distance and the normal similarity. The following equations (15a)-(15c) specify weights that can be used to compute a weighted PCA:

$$\psi_{ik} = \exp\left(-\frac{\|p_i - p_k\|^2}{\mathcal{D}^2}\right) \tag{15a}$$

$$\theta_{ik} = \exp\left(-\frac{(1 - n_k^T n_i)^2}{\max(1e^{-5}, 1 - \cos(\Theta))}\right) \tag{15b}$$

$$\varphi_{ik} = \frac{1}{o_k + 1} \tag{15c}$$

Equation (15a) defines a bilateral weight that favors neighboring points 130 that are spatially close. Equation (15b) defines a bilateral weight that favors neighboring points 130 that have similar point normals 134. Equation (15c) defines the visibility weight based on an occlusion counter $o_k$ that counts the number of times $p_k$ is occluded in all camera views. In Equations (15a)-(15c) $p_i$ denotes a particular point and $p_k$ denotes one point in the neighborhood of $p_k \in \{p | \|p - p_i\| \le \mathcal{D}\}$. In equation 15(b), $\theta$ is a constant ($\pi/3$).

In some embodiments, a reliable projection plane is obtained using singular value decomposition from the weighted vectors using the following equation (16):

$$w_{ik}\left(p_i - \sum_{k=0}^{K} w_{ik} p_k\right), \text{ where } w_{ik} = \frac{\psi_{ik}\theta_{ik}\varphi_{ik}}{\sum_{i=0}^{K} \psi_{ik}\theta_{ik}\varphi_{ik}} \tag{16}$$

The repulsion loss term 430 can be defined using the following equations (17a) and (17b):

$$\mathcal{L}_r = \frac{1}{N} \sum_N \sum_K \frac{\Psi_{ik}}{d_{ik}^2 + 10^{-4}} \tag{17a}$$

$$d_{ik} = \tilde{V}\tilde{V}^T(p_i - p_k) \tag{17b}$$

In equations (17a) and (17b), $d_{ik}$ is the point-to-point distance and V contains the first two principal components.

The projection loss term 480 can be defined using the following equations (18a) and (18b):

$$\mathcal{L}_\rho = \frac{1}{N} \sum_N \sum_K w_{ik} d_{ik}^2 \tag{18a}$$

$$d_{ik} = V_n V^T(p_i - p_k), \tag{18b}$$

In equations (18a) and (18b), $V_n$ is the last components.

In alternate embodiments, any number of software applications (e.g., the differentiable rendering application 102, the inverse rendering application 120, the regularization engine 180, the optimization engine 190, a neural network, etc.) may implement any number of regularization terms in any technically feasible fashion. In the same or other embodiments, any number of software applications may implement any number and type of technically feasible techniques that drive the points 130 towards the most plausible point configuration, such as a relatively uniform distribution on local geometric structures.

Figure 5:
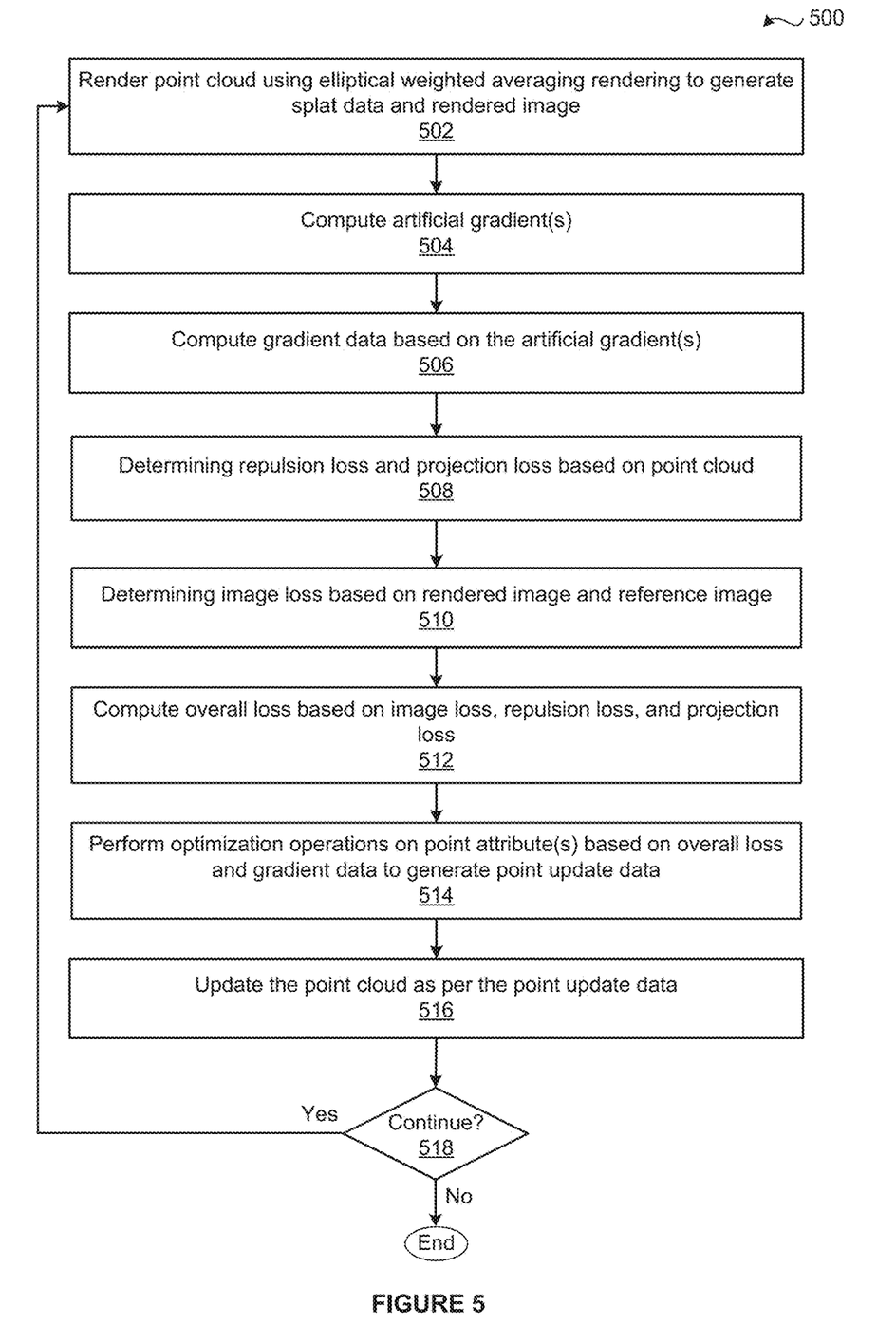
FIG. 5 is a flow diagram of method steps for determining attributes associated with 3D scenes based on 2D images, according to various embodiments.

FIG. 5 is a flow diagram of method steps for determining attributes associated with 3D scenes based on 2D images, according to various embodiments. Although the method steps are described with reference to the systems of FIGS. 1-4, persons skilled in the art will understand that any system configured to implement the method steps, in any order, falls within the scope of the embodiments.

As shown, a method 500 begins at step 502, where the splatting engine 142 performs rendering operations on the point cloud 122 using elliptical weighted averaging rendering to generate the splat data 144 and the rendered image 150. At step 504, the gradient engine 160 computes one or more artificial gradients 220, where each of the artificial gradients 220 is associated with a different combination of the pixels 230 and the points 130. At step 506, the gradient engine 160 computes the gradient data 164 based on the artificial gradient(s) 220.

At step 508, the regularization engine 180 computes the repulsion loss 182 and the projection loss 184 based on the point cloud 122. At step 510, the optimization engine 190 determines the image loss 192 based on the rendered image 150 and the reference image 152. At step 512, the optimization engine 190 computes the overall loss 194 based on image loss 192, the repulsion loss 182, and the projection loss 184. At step 514, the optimization engine 190 performs any number and type of optimization operations on any number and type of attributes of any number of the points 130 based on the overall loss 194 and the gradient data 164 to generate the point update data 196.

At step 516, the inverse rendering application 120 updates the point cloud 122 as per the point update data 196. At step 518, the inverse rendering application 120 determines whether to continue iterating. The inverse rendering application 120 may determine whether to continue iterating in any technically feasible fashion. If, at step 518, the inverse rendering application 120 determines to continue iterating, then the method 500 returns to step 502, where the splatting engine 142 performs rendering operations on the point cloud 122 to generate new splat data 144 and a new rendered image 150. If, however, at step 518, the inverse rendering application 120 determines to cease iterating, then the method 500 terminates.

In sum, the disclosed techniques may be used to efficiently and accurately infer attributes of 3D scenes based on 2D images. In a forward pass, a differentiable rendering application performs screen space elliptical weighted average (EWA) filtering on point attributes to compute pixel values for a rendered image. More specifically, the differentiable rendering application represents each point as a disk or ellipse in the source space and projects the ellipse onto the screen space to form a splat. The differentiable rendering application then interpolates the splats to facilitate hole-free and antialiased renderings. Notably, the overall rendering function can be factorized into a fully differentiable term and a discontinuous visibility term In a forward pass, the rendering application defines a gradient for a pixel value with respect to a point despite the discontinuous visibility term. The gradient includes an approximate partial derivative of the pixel value with respect to the point position and an approximate partial derivative of the pixel value with respect to the point normal. For the partial derivative of the pixel value with respect to the point position, the rendering application approximates the contribution of the discontinuous visibility term with an artificial gradient. For the partial derivative of the pixel value with respect to the point normal, the rendering application approximates the contribution of the discontinuous visibility term as zero. The rendering application computes the gradients for any number of pixel values with respect to any number of points and transmits the gradients as gradient data to an inverse rendering application.

The inverse rendering application independently optimizes point positions and point normals based on an overall loss function and the gradient data. For instance, in some embodiments, the inverse rendering application independently optimizes and modifies the point normals during Tn passes and then independently optimizes and modifies the point positions during Tp subsequent passes. The overall loss function is a weighted aggregation of an image loss function, a repulsion loss term and a projection loss term. The artificial gradients enable the inverse rendering application to effectively optimize the point attributes based on any type of image loss function. Optimizing the repulsion loss term facilitates uniform point distributions by maximizing the distances between the neighbors of the point selected for optimization on a local projection plane. In a complimentary fashion, optimizing the projection loss term preserves clean surfaces by minimizing the distance from the point selected for optimization to the surface tangent plane.

At least one technical advantage of the disclosed techniques relative to the prior art is that the differentiable rendering application can be inserted into neural networks to more efficiently and more reliably solve computer vision problems. In particular, performing optimization operations on relatively unstructured point clouds instead of relatively structured polygon meshes enables the inverse rendering application, a neural network, or any other optimization algorithm to effectively infer changes at any scale. For example, connectivity information is not directly represented in point clouds. Consequently, the inverse rendering application can make topology changes (e.g., merging and/or separating surfaces) when optimizing the point cloud to more accurately represent 3D objects relative to prior art approaches. Furthermore, by implementing surface regularization terms, the inverse rendering application can ensure that points stay on local geometric structures with uniform distribution. In another example, the inverse rendering application can modify the normal of a point independently of the position of the point, which allows the inverse rendering application to more effectively infer small scale details of 3D objects conveyed via normals, such as the lighting of surface bumps, relative to prior art approaches. These technical advantages provide one or more technological advancements over the prior art.

1. In some embodiments, a computer-implemented method for inferring attributes associated with a three-dimensional (3D) scene comprises rendering a first image based on a first plurality of points associated with the 3D scene; generating a first artificial gradient that approximates a change in a first value of a first pixel included in the first image with respect to a change in a first attribute of a first point included in the first plurality of points; and performing one or more optimization operations on the first point based on the first artificial gradient to generate a second plurality of points, wherein an error associated with the second plurality of points is less than an error associated with the first plurality of points.

2. The computer-implemented method of clause 1, wherein performing the one or more optimization operations comprises modifying a first position of the first point to generate a second position of a second point included in the second plurality of points, wherein the first point and the second point have a same first normal.

3. The computer-implemented method of clauses 1 or 2, wherein performing the one or more optimization operations comprises comparing the first image to a reference image to compute an image loss; and modifying at least the first attribute of the first point based on the first artificial gradient to reduce the image loss.

4. The computer-implemented method of any of clauses 1-3, wherein performing the one or more optimization operations comprises comparing the first image to a reference image to compute an image loss; computing one or more surface regularization losses based on the first plurality of points; computing the error associated with the first plurality of points based on the image loss and the one or more surface regularization losses; and moving the first point in a direction associated with the first artificial gradient to reduce the error associated with the first plurality of points.

5. The computer-implemented method of any of clauses 1-4, wherein the number of distinct surfaces represented by the first plurality of points is not equal to the number of distinct surfaces represented by the second plurality of points.

6. The computer-implemented method of any of clauses 1-5, wherein the first attribute comprises a first position, and generating the first artificial gradient comprises computing a translation vector that acts to decrease an image loss between the first image and a reference image at the first pixel; and scaling the translation vector based on the change in the first value of the first pixel.

7. The computer-implemented method of any of clauses 1-6, wherein generating the first artificial gradient comprises factoring a discontinuous rasterization function to generate a visibility step function; and computing an approximation of the change in the first value of the first pixel with respect to the change in the first attribute of the first point based on the visibility step function.

8. The computer-implemented method of any of clauses 1-7, wherein the first attribute of the first point comprises a normal, and generating the first artificial gradient comprises setting the first artificial gradient equal to zero.

9. The computer-implemented method of any of clauses 1-8, wherein the first attribute of the first point comprises a position or a normal, and the first value of the first pixel is associated with at least one of a color, a shading, and a depth value.

10. The computer implemented method of any of clauses 1-9, wherein rendering the first image comprises performing one or more elliptical filtering operations on the first plurality of points.

11. In some embodiments, one or more non-transitory computer readable media include instructions that, when executed by one or more processors, cause the one or more processors to infer attributes associated with a three-dimensional (3D) scene by performing the steps of rendering a first image based on a first plurality of points associated with the 3D scene; and generating a first artificial gradient that approximates a change in a first value of a first pixel included in the first image with respect to a change in a first attribute of a first point included in the first plurality of points; wherein one or more optimization operations are performed on the first point based on the first artificial gradient to generate a second plurality of points, wherein an error associated with the second plurality of points is less than an error associated with the first plurality of points.

12. The one or more non-transitory computer readable media of clause 11, wherein performing the one or more optimization operations comprises modifying a first normal associated with the first point to generate a second normal associated with a second point included in the second plurality of points, wherein the first point and the second point reside at a same first position.

13. The one or more non-transitory computer readable media of clauses 11 or 12, wherein performing the one or more optimization operations comprises modifying the first attribute of the first point to reduce at least one of an image loss, a distance between the first point and a second point included in the first plurality of points, and a distance between the first point and a surface tangent plane.

14. The one or more non-transitory computer readable media of any of clauses 11-13, wherein the number of distinct surfaces represented by the first plurality of points is not equal to the number of distinct surfaces represented by the second plurality of points.

15. The one or more non-transitory computer readable media of any of clauses 11-14, further comprising computing a translation vector that acts to decrease an image loss between the first image and a reference image at the first pixel; and computing the change in the first value of the first pixel based on the translation vector.

16. The one or more non-transitory computer readable media of any of clauses 11-15, wherein generating the first artificial gradient comprises factoring a discontinuous rasterization function to generate a visibility step function; and computing an approximation of the change in the first value of the first pixel with respect to the change in the first attribute of the first point based on the visibility step function.

17. The one or more non-transitory computer readable media of any of clauses 11-16, wherein the first attribute of the first point comprises a normal, and generating the first artificial gradient comprises setting the first artificial gradient equal to zero.

18. The one or more non-transitory computer readable media of any of clauses 11-17, wherein the first attribute of the first point comprises a position or a normal, and the first value of the first pixel is associated with at least one of a color, a shading, and a depth value.

19. The one or more non-transitory computer readable media of any of clauses 11-18, wherein rendering the first image comprises performing one or more elliptical filtering operations on the first plurality of points.

20. In some embodiments, a system comprises one or more memories storing instructions; and one or more processors that are coupled to the one or more memories and, when executing the instructions, are configured to perform one or more rendering operations on a first point cloud associated with a 3D scene to generate a first image; compute an artificial gradient that approximates a change in a first value of a first pixel included in the first image with respect to a change in a first attribute of a first point included in the first point cloud; and perform one or more optimization operations on the first point based on the artificial gradient to generate a second point cloud, wherein an error associated with the second point cloud is less than an error associated with the first point cloud.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for inferring attributes associated with a three-dimensional (3D) scene, the method comprising:
    generating a first image based on a first plurality of points associated with the 3D scene;
    generating a gradient that represents a change in a value of a pixel included in the first image with respect to a given point included in the first plurality of points; and
    performing one or more optimization operations on the given point based on the gradient to generate a second plurality of points, wherein an error associated with the second plurality of points is less than an error associated with the first plurality of points.

2. The computer-implemented method of claim 1, wherein performing the one or more optimization operations comprises modifying a first position of the given point to generate a second position of a second point included in the second plurality of points, wherein the given point and the second point have a same first normal.

3. The computer-implemented method of claim 1, wherein performing the one or more optimization operations comprises:
    comparing the first image to a reference image to compute an image loss; and
    modifying at least a first attribute of the given point based on the gradient to reduce the image loss.

4. The computer-implemented method of claim 1, wherein performing the one or more optimization operations comprises:
    comparing the first image to a reference image to compute an image loss;
    computing one or more surface regularization losses based on the first plurality of points;
    computing the error associated with the first plurality of points based on the image loss and the one or more surface regularization losses; and
    moving the given point in a direction associated with the gradient to reduce the error associated with the first plurality of points.

5. The computer-implemented method of claim 1, wherein number of distinct surfaces represented by the first plurality of points is not equal to number of distinct surfaces represented by the second plurality of points.

6. The computer-implemented method of claim 1, wherein generating the gradient comprises:
    computing a translation vector that acts to decrease an image loss between the first image and a reference image at the pixel; and
    scaling the translation vector based on the change in the value of the pixel.

7. The computer-implemented method of claim 1, wherein generating the gradient comprises:
   factoring a discontinuous rasterization function to generate a visibility step function; and
   computing an approximation of the change in the value of the pixel with respect to a change in a first attribute of the given point based on the visibility step function.

8. The computer-implemented method of claim 1, wherein a first attribute of the given point comprises a normal, and generating the gradient comprises setting the gradient equal to zero.

9. The computer-implemented method of claim 1, wherein a first attribute of the given point comprises a position or a normal, and the value of the pixel is associated with at least one of a color, a shading, and a depth value.

10. The computer implemented method of claim 1, wherein rendering the first image comprises performing one or more elliptical filtering operations on the first plurality of points.

11. One or more non-transitory computer readable media including instructions that, when executed by one or more processors, cause the one or more processors to infer attributes associated with a three-dimensional (3D) scene by performing the steps of:
   generating a first image based on a first plurality of points associated with the 3D scene;
   generating a gradient that represents a change in a value of a pixel included in the first image with respect to a given point included in the first plurality of points; and
   performing one or more optimization operations on the given point based on the gradient to generate a second plurality of points, wherein an error associated with the second plurality of points is less than an error associated with the first plurality of points.

12. The one or more non-transitory computer readable media of claim 11, wherein performing the one or more optimization operations comprises modifying a first position of the given point to generate a second position of a second point included in the second plurality of points, wherein the given point and the second point have a same first normal.

13. The one or more non-transitory computer readable media of claim 11, wherein performing the one or more optimization operations comprises modifying a first attribute of the given point to reduce at least one of an image loss, a distance between the given point and a second point included in the first plurality of points, and a distance between the given point and a surface tangent plane.

14. The one or more non-transitory computer readable media of claim 11, wherein a number of distinct surfaces represented by the first plurality of points is not equal to a number of distinct surfaces represented by the second plurality of points.

15. The one or more non-transitory computer readable media of claim 11, further comprising:
   computing a translation vector that acts to decrease an image loss between the first image and a reference image at the pixel; and
   computing a change in the value of the pixel based on the translation vector.

16. The one or more non-transitory computer readable media of claim 11, wherein generating the gradient comprises:
   factoring a discontinuous rasterization function to generate a visibility step function; and
   computing an approximation of a change in the value of the first pixel with respect to a change in an attribute of the given point based on the visibility step function.

17. The one or more non-transitory computer readable media of claim 11, wherein an attribute of the given point comprises a normal, and generating the gradient comprises setting the gradient equal to zero.

18. The one or more non-transitory computer readable media of claim 11, wherein an attribute of the given point comprises a position or a normal, and the value of the pixel is associated with at least one of a color, a shading, and a depth value.

19. The one or more non-transitory computer readable media of claim 11, wherein generating the first image comprises performing one or more elliptical filtering operations on the first plurality of points.

20. A system, comprising:
   one or more memories storing instructions; and
   one or more processors that are coupled to the one or more memories and, when executing the instructions, are configured to:
      generate a first image based on a first plurality of points associated with the 3D scene;
      generating a gradient that represents a change in a value of a pixel included in the first image with respect to a given point included in the first plurality of points; and
      performing one or more optimization operations on the given point based on the gradient to generate a second plurality of points, wherein an error associated with the second plurality of points is less than an error associated with the first plurality of points.

* * * * *

UNITED STATES PATENT AND TRADEMARK OFFICE
CERTIFICATE OF CORRECTION

Page 1 of 1

PATENT NO. : 11,074,743 B2
APPLICATION NO. : 16/586746
DATED : July 27, 2021
INVENTOR(S) : Ahmet Cengiz Öztireli et al.

It is certified that error appears in the above-identified patent and that said Letters Patent is hereby corrected as shown below:

On the Title Page

(73) Assignee:
Please delete "Disney Enterprises, Inc., Burbank, CA (US)" and insert --Disney Enterprises, Inc., Burbank, CA (US); ETH Zürich, Zurich (CH)--;

(56) References Cited:
Please delete "Rover et al., "A Network Architecture for Point Cloud Classification via Automatic Depth Images Generation", In Proc. IEEE Conf. on Computer Vision and Pattern Recognition, 2018, pp. 4176-4184." and insert --Roveri et al., "A Network Architecture for Point Cloud Classification via Automatic Depth Images Generation", In Proc. IEEE Conf. on Computer Vision and Pattern Recognition, 2018, pp. 4176-4184.--;

In the Claims

Column 24, Claim 16, Line 17, please delete "first".

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*